United States Patent [19]
Itoh et al.

[11] Patent Number: 5,703,626
[45] Date of Patent: Dec. 30, 1997

[54] PORTABLE ELECTRIC APPARATUS USING A PEN MEMBER FOR INPUTTING INFORMATION

[75] Inventors: Masashi Itoh, Hadaro; Yasutaka Koga, Kanagawa, both of Japan

[73] Assignee: Ricoh Company, Ltd., Tokyo, Japan

[21] Appl. No.: 642,943

[22] Filed: May 6, 1996

[30] Foreign Application Priority Data

May 15, 1995 [JP] Japan .................................. 7-115885

[51] Int. Cl.[6] .................................................. G09G 5/00
[52] U.S. Cl. ............................. 345/173; 345/179; 178/18
[58] Field of Search ............................. 345/173, 174, 345/175, 176, 177, 178, 179, 180; 178/18, 19; 364/708.1; 361/681, 683; 401/88, 90

[56] References Cited

U.S. PATENT DOCUMENTS 5,067,573  11/1991  Uchida ................................ 345/173
5,530,208   6/1996  Moriconi et al. .................... 345/179

Primary Examiner—Mark R. Powell
Assistant Examiner—Matthew Luu
Attorney, Agent, or Firm—Oblon, Spivak, McClelland, Maier & Neustadt, P.C.

[57] ABSTRACT

A portable electric apparatus includes an LCD panel for displaying and obtaining information by using a pen member. The apparatus provides for a storage portion of the pen member on the surface of the portable electric apparatus. The storage portion provides for a holding member which holds the pen member in a stable manner. The holding member is made of an elastic material and covers the pen member in the storage portion. The pen member has a flat oval shape in cross-section so as to be stable when stored in the storage portion.

8 Claims, 3 Drawing Sheets

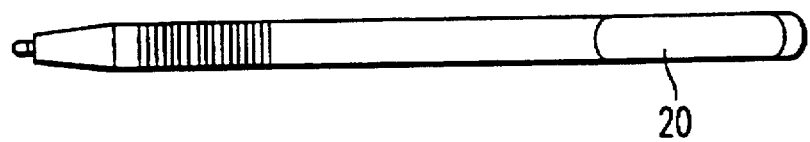
*FIG. 3a*
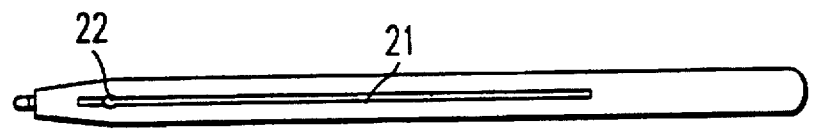
*FIG. 3b*
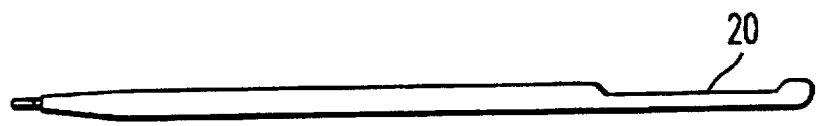
*FIG. 3c*
*FIG. 4* PRIOR ART
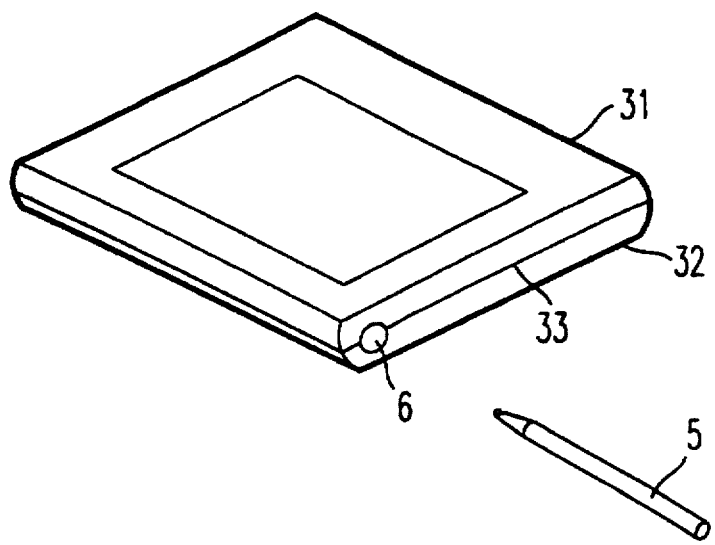

1

PORTABLE ELECTRIC APPARATUS USING A PEN MEMBER FOR INPUTTING INFORMATION

BACKGROUND OF THE INVENTION

1. Field of the Invention

This invention relates to the field of portable electric apparatuses, such as personal digital assistants or palm-top computers, and in particular relates to an apparatus which equips a pen member for inputting information to the apparatus therein.

2. Discussion of the Background

According to the development of technology in recent years, it has become popular to use a portable electric apparatus, such as a personal digital assistant or a palm-top computer. These apparatuses may be provided with an LCD (Liquid Crystal Device) panel for displaying information of the apparatus therein. Some of these kinds apparatuses are further provided with a pointing device which looks like a pen for obtaining information in place of a keyboard, that is, a pen member. This kind of the portable electric apparatus may be provided a storage portion of the pen member so as not become lost when carrying the portable electric apparatus.

FIGS. 4 and 5 show related structures of a portable electric apparatus which provides the storage portion inside a body member of the apparatus therein. FIG. 4 is a perspective view of the portable electric apparatus. In FIG. 4, the storage portion 6 provides for storing the pen member 5. The pen member 5 is approximately circular in cross sectional view. The storage portion 6 includes a dividing line 33 which is located between an upper case 31 and a lower case 32 of the main body of the portable electric apparatus.

FIG. 5 is another view of the portable electric apparatus shown in FIG. 4. In FIG. 5, the storage portion 6 is formed as a cylindrical space formed on the parting line 33 and is of an approximately cylindrical shape corresponding with pen member 5.

However, in this conventional apparatus, the position of the storage portion 6 has been limited to a joint portion in the body member, that is, along the dividing line 33. In case the storage portion is provided with another arrangement, additional costs in manufacturing the portable electric apparatus result. Additionally, the portable electric apparatus may be required to have a highly integrated arrangement of components therein, such as an MPU (Micro Processor Unit) or memory devices. Therefore, it is preferable to provide flexibility for arranging the components, especially inside of the portable electric apparatus.

Furthermore, when forming the storage portion as merely a cylindrical space, it is necessary to provide a mechanism, such as a lid, for preventing the pen member from falling out when carrying the portable electric apparatus. Accordingly, the lid mechanism would also need to be provided for such apparatus. However, this would increase the cost of the portable electric apparatus.

SUMMARY OF THE INVENTION

Accordingly, one object of the present invention is to provide a portable electric apparatus which does not limit the position of the storage portion as being along the dividing line.

Another object of the present invention is to provide a flexible arrangement for the storage portion of the pen member in the portable electric apparatus.

A further object of the present invention is to provide a portable electric apparatus which holds the pen member easily and stably, even when carrying the portable electric apparatus.

In the present invention, the portable electric apparatus provides for a storage portion of the pen member on a surface of the portable electric apparatus thereof. The storage portion provides for a holding member which holds the pen member in a stable manner. The holding member preferably includes a strip by made of elastic materials which cover the pen member in the storage potion. The pen member has a flat oval shape in a cross section view so as to be stably secured in the storage portion even when carrying the portable electric apparatus.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 3(a), 3(b), and 3(c) show a plurality of views of the pen member of the present invention.

FIG. 4 shows a perspective view of a related embodiment of the portable electric apparatus.

DESCRIPTION OF THE PREFERRED EMBODIMENTS

The present invention may be implemented as a part of a portable electric apparatus. It will be apparent, however, to one skilled in the art that the present invention may be practiced without such specific details. In other instances, well-known processing features of the portable electric apparatus therein, have not been shown in detail in order not to unnecessarily obscure the invention.

Figure 1:
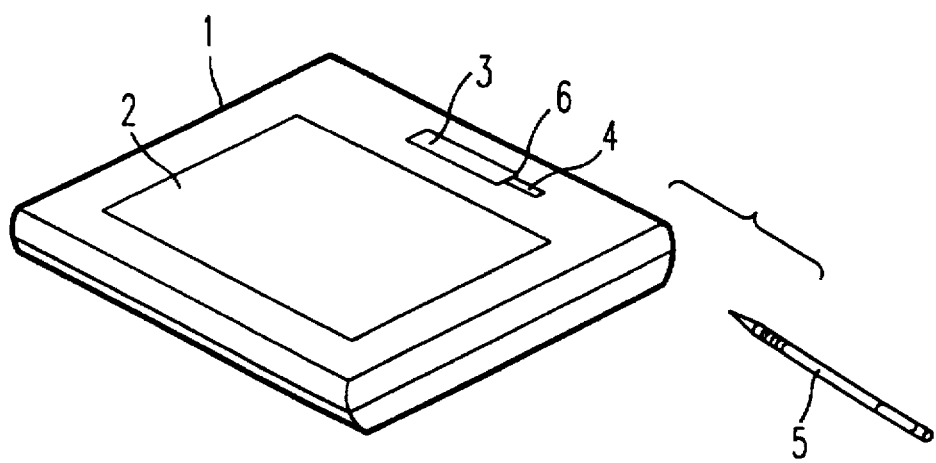
FIG. 1 shows a perspective view of the portable electric apparatus of the present invention.

Referring now to the drawings, wherein like reference numerals designate identical or corresponding parts throughout the several views, and more particularly to FIG. 1 thereof, FIG. 1 shows a perspective view of the portable electric apparatus of the present invention. In FIG. 1, the portable electric apparatus 1 provides an input/display unit 2, such as an LCD panel with a touch sensor for obtaining information and for displaying processing results of the information by the portable electric apparatus 1.

The input/display unit 2 is provided on the upper surface of the portable electric apparatus thereof. Input information, such as a command or characters, is provided by the input/display unit 2 which includes a pen member 5, which is styled like a pen. The pen member 5 allows for inputting information to the input/display unit 2 with a stroke of the pen member 5, or the designation of coordinates on the input/display unit 2 using the point of the pen member 5. The cross section of the pen member 5 may be in the form of a flat oval shape so that it is possible to be easily held and be stable in a user's hand.

A holder 3 and a storage recess or groove 4 form a storage portion 6 for the pen member 5. The storage recess 4 is provided on the surface of the portable electric apparatus 1 for storing the pen member 5. The holder 3 is flat shaped like a strip of paper and covers the pen member 5 when it is stored in the storage recess 4. Therefore, the holder 3 is wider than the storage recess 4 and at least one end portion of the holder 3 may engage the storage recess 4 so as to cover the storage recess 4. Furthermore, the holder 3 is made of an elastic material, such as rubber, so as to easily fill the storage portion 6.

Figure 2A:
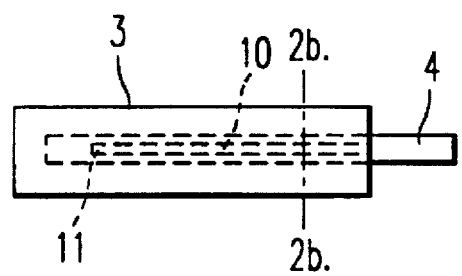
FIGS. 2(a) and 2(b) show different, views of the pen member and the storage portion of the present invention.
Figure 2B:
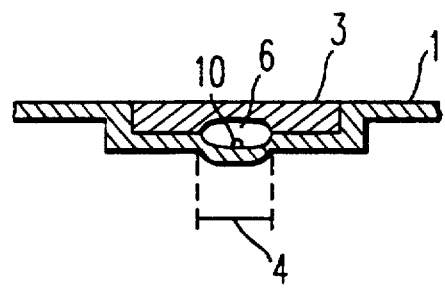
Figure 5:
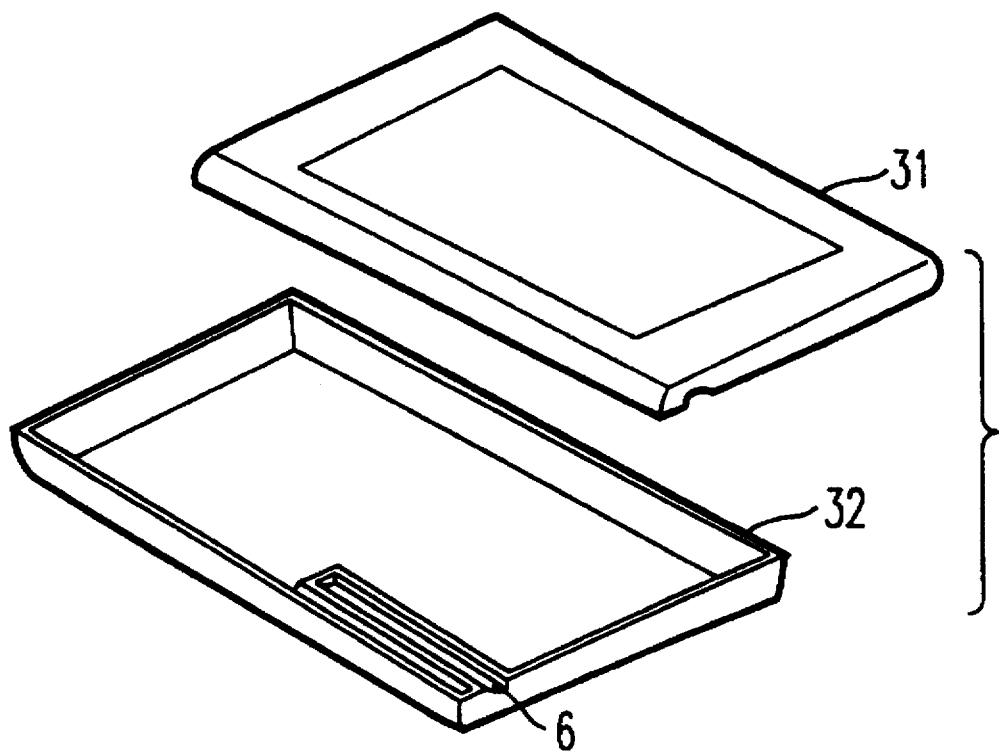
FIG. 5 shows an another perspective view of a related embodiment of the portable electric apparatus.

FIGS. 2(a) and 2(b) respectively show a top plan view and cross-sectional view of the storage portion 6 in the present embodiment. FIG. 2(b) shows a cross section view of the storage portion 6 taken along line 2—2' shown in FIG. 2(a). In FIG. 2(a), the holder 3 is shorter in length than the pen member 5. For example, the holder 3 covers with the storage recess 4 over about 80% of total length of the storage recess 4. This length is useful for removing the pen member 5 from the storage portion 6.

As, shown in FIG. 2(b), the holder 3 is formed so as to have an upper surface which is an extension of the upper surface of the portable electric apparatus 1. Furthermore, the holder 3 provides a recess or groove formed on the back side of the holder 3. The recess is U-shaped in cross section as viewed along line 2—2' of FIG. 2(a). The recess of the holder 3 is aligned with the storage recess to permit the pen member 5 to be located therein. Therefore, the recess of the holder 3 and the storage recess 4 together form a space for storing the pen member 5 and comprise the storage portion 6.

Furthermore, as shown in FIGS. 2(a) and 2(b), the storage portion 6 includes a guide rail 10 located along the center and bottom of the storage recess 4. Furthermore, the guide rail 10 forms a projection which includes a stopper 11 which is in the form of a notch on the guide rail 10. The guide rail 10 and the stopper 11 cooperate with the back side of the pen member 5, as explained hereinbelow.

FIGS. 3(a), 3(b), and 3(c) show a plurality of views of the pen member 5 of the present invention. FIG. 3(a) is top plan view, FIG. 3(b) is a bottom back view, and FIG. 3(c) is a left side elevational view of the pen member 5. The point of the pen member 5 is of a shape which corresponds with that of ball-point pen. The point provides some roundness and hardness and can be used like a pen. Accordingly, the point of the pen member 5 does not damage the surface of the input/display unit 2 when used for inputting information. The cross section of the pen member 5 need not be shaped like a conventional pencil or pen, which are shaped as a circle or a hexagon in cross section. The flat oval section of the pen member 5 is instead preferable so as to reduce the thickness or height of the storage portion 6.

As shown in FIGS. 3(a) and 3(c), the pen member 5 is provided with a flat portion 20 near a rear end portion that is opposite the end having the point. The flat portion 20 provides for cooperation with the thumb of the user's hand. The flat portion 20 is not provided for writing with the pen member 5, and instead is provided so as to become comfortable for the fingers of the user's hand. Furthermore the flat portion 20 does not reach all the way to the rear end of the pen member 5. It is provided so as to make the pen member easy to handle when picking the pen up from the storage portion 6, and to allow the user's fingers to easily grasp an end of the flat portion 20.

As shown in FIG. 3(b), a guide recess 21 is provided along the backside, along the centerline of the pen member 5. The guide recess 21 is provided to correspond with the guide rail 10 when the pen member 5 is stored in the storage portion 6. Furthermore, a hole portion 22 is provided for the guide recess 21 so as to form a half spherical hole which is deeper than the guide recess 21. The hole portion 22 corresponds with the stopper 11 on the guide rail 10 when the pen member 5 is stored in the storage portion 6.

When the pen member 5 is to be stored in the storage portion 6, the user's thumb can engage with the flat portion 20, and the forefinger and middle finger can grasp the backside of the pen member 5. Then the pen member 5 can slide into the storage portion 6 to reach the storage recess 4. When the pen member 5 is slid into the storage portion 6 beyond the edge of the holder 3, the guide rail 10 and the guide recess 21 became connected with each other. Accordingly, the guide rail 10 and the guide recess 21 assist in the insertion of the pen member 5, and cooperate with each other for inserting the pen member 5 smoothly. Then, as the result of insertion, the stopper 11 and the hole portion 22 engage each other so that the pen member 5 is able to be held stably in the storage portion 6. Therefore, after the insertion, the pen member 5 is assuredly fixed in the storage portion 6 due to the elasticity of the holder 3 and the connection of the stopper 11 with the hole portion 22 in the present embodiment. Accordingly, the pen member 5 is stored stably even when being carried in the portable electric apparatus.

When the pen member 5 is to be picked up from the storage portion 6, the user's thumb engages the end of the flat portion 20 so as to pull out the pen member 5 easily. Then, the holder 3 is bent upwardly, the stopper 11 because disengaged from the hole portion 22 due to the hole portion 22 being of a semispherical shape.

The above described embodiment has the storage portion 6 located on the upper surface of the portable electric apparatus 1. However, it may be provided on to the backside, that is, on an opposite side of the indication/display unit 2, or on a side surface of the portable electric apparatus 1. Furthermore, the guide rail 10 and the guide recess may be reversely arranged with respect to each other for the pen member 5 and the storage portion 6 in implementation.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A portable electric apparatus processing input information and displaying results of said information processing, which comprises:

a panel member displaying processing results and information for said portable electric apparatus;

a pen member inputting said information to said panel member;

a storage member located on a surface of said portable electric apparatus, said storage member storing said pen member therein wherein said storage member has a guide rail guiding said pen member; and a holding member holding said pen member on the surface of the portable electric apparatus.

2. A portable electric apparatus recited in claim 1 wherein said holding member provide is formed of a material which covers a surface portion of said storage portion.

3. A portable electric apparatus recited in claim 1 wherein said pen member is oval shaped in cross section.

4. A portable electric apparatus recited in claim 3 wherein said pen member has a flat surface of a predetermined length in proximity with a rear end of said pen member.

5. A portable electric apparatus recited in claim 1 wherein said storage member has a recess with which said pen member engages.

6. A portable electric apparatus recited in claim 1 wherein said rail further has a notch which is engageable with said pen member.

7. A portable electric apparatus recited in claim 2 wherein said holding member is engageable with an end portion of said storage member.

8. A portable electric apparatus processing input information and displaying results of said information processing, which comprises:

a panel member displaying processing results and obtaining information for said portable electric apparatus;

a pen member inputting said information to said panel member, said pen member further comprising a guide portion guiding storage of said pen member;

a storage member provided on a surface of said portable electric apparatus, said storage member storing said pen member in the storage member, corresponding to said guide portion; and a holding member holding said pen member in said storage member, said holding member being made of an elastic material.

* * * * *